Figure 1:
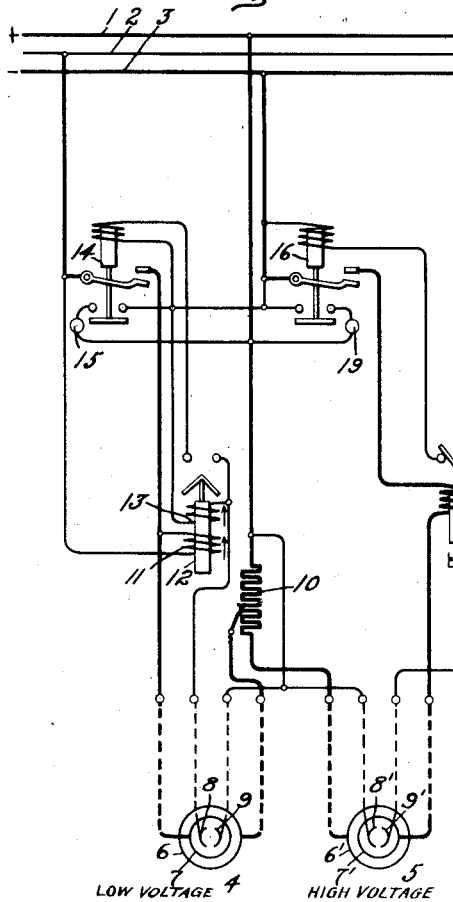

Oct. 23, 1923.

H. M. JACOBS

BATTERY CHARGING SYSTEM

Filed April 6, 1921  2 Sheets-Sheet 1

Inventor:
Harry M. Jacobs,
by
His Attorney.

Oct. 23, 1923.

H. M. JACOBS 1,471,897

BATTERY CHARGING SYSTEM

Filed April 6, 1921   2 Sheets-Sheet 2

Inventor:
Harry M. Jacobs,
by Albert G. Davis
His Attorney.

Patented Oct. 23, 1923.

1,471,897

UNITED STATES PATENT OFFICE.

HARRY M. JACOBS, OF SCHENECTADY, NEW YORK, ASSIGNOR TO GENERAL ELECTRIC COMPANY, A CORPORATION OF NEW YORK.

BATTERY-CHARGING SYSTEM.

Application filed April 6, 1921. Serial No. 459,111.

*To all whom it may concern:*

Be it known that I, HARRY M. JACOBS, a citizen of the United States, residing at Schenectady, in the county of Schenectady, State of New York, have invented certain new and useful Improvements in Battery-Charging Systems, of which the following is a specification.

My invention relates to battery charging systems and particularly to such systems which are used in railroad terminals, garages and similar places where batteries of different potentials are charged.

In such systems the sources of charging current are usually connected to a number of similar receptacles about the terminal or building in which the system is installed, and the batteries to be charged are connected to the proper source by means of flexible cables having at one end suitable plugs which are adapted to be inserted in said receptacles, the other end of these cables being connected to the batteries to be charged. The plugs and receptacles are usually of such a construction that it is impossible to make a reversed polarity connection, but it is possible to place the plug in the wrong receptacle so that a low potential battery is connected to a high potential source or a high potential battery is connected to a low potential source.

One object of my invention is to provide in such a battery charging system, an arrangement whereby the insertion of a plug, to which the battery is connected, into a receptacle effects the completion of a charging circuit between said source and battery if the source is a proper one to charge said battery but does not effect the completion of said charging circuit if the source is not the proper one to charge said battery.

Another object of my invention is to provide an arrangement whereby the charging circuit is opened and closed by a suitable automatic switch and not at the contacts of the manually controlled switch used to connect the battery to the source of charging current, thereby preventing an arc being formed at the contacts of the manually controlled switch when said switch is opened.

A further object of my invention is to provide an arrangement whereby a plurality of sources of charging current are connected to a receptacle in such a manner that when the battery plug is inserted in the receptacle a charging circuit is automatically completed between the battery and the proper one of said sources of charging current.

A further object of my invention is to provide an arrangement for preventing more than one charging circuit from being closed to a battery when the plug to which it is connected is inserted in the receptacle which is adapted to be connected to a plurality of sources of charging current.

A further object of my invention is to provide a suitable signal for indicating whether or not a battery is being charged and from which source it is being charged.

My invention will be better understood from the following description taken in connection with the accompanying drawings, and its scope will be pointed out in the appended claims.

Figure 2:
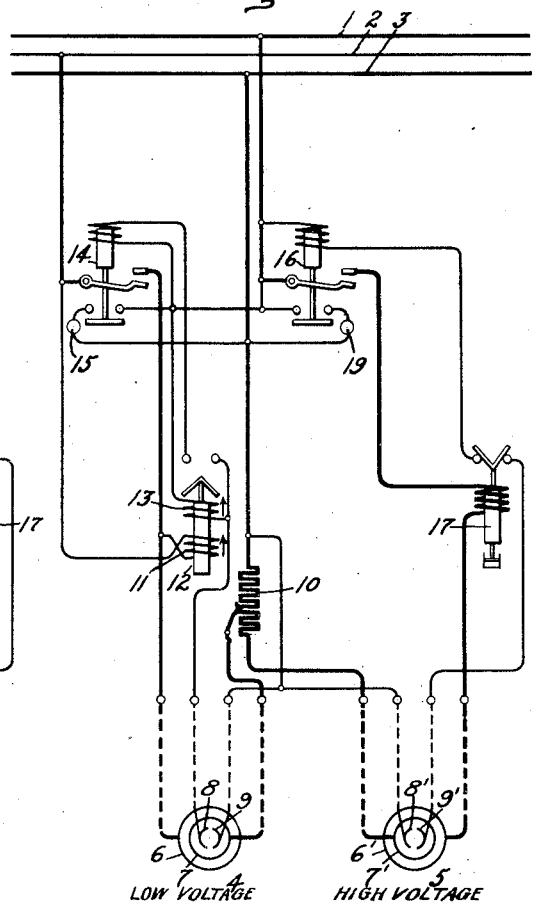
Figure 4:
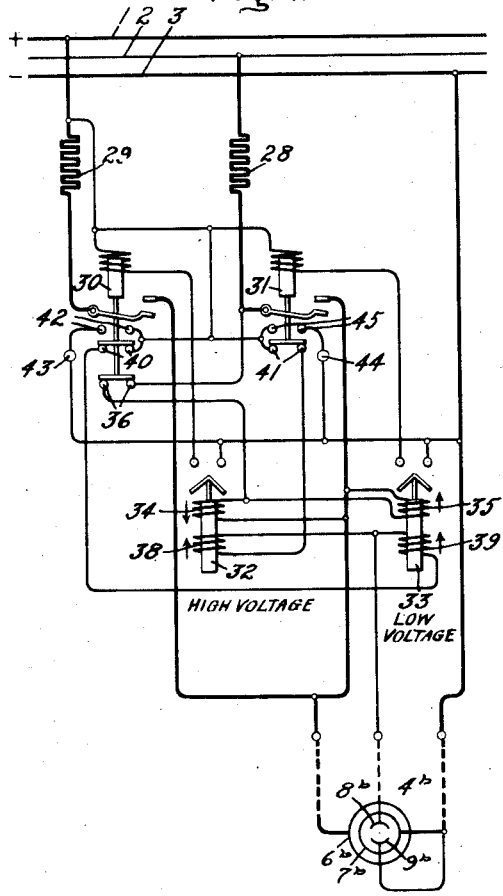
Figure 5:
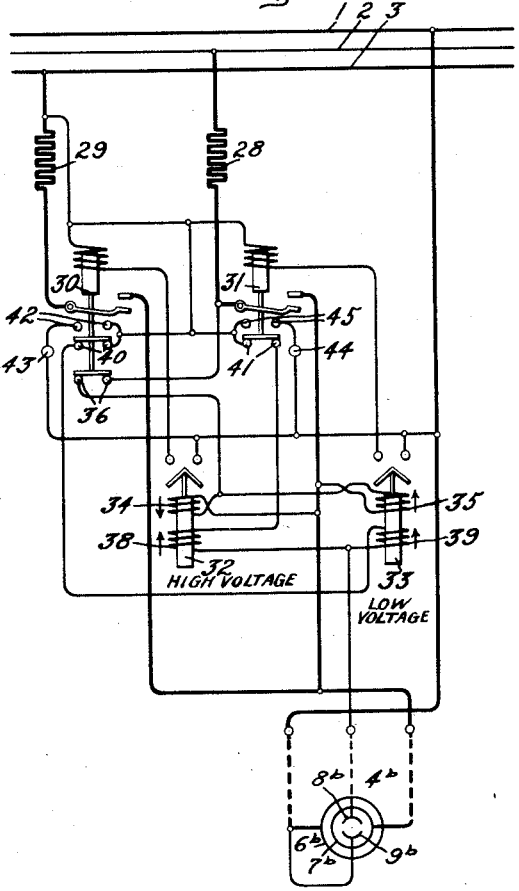
Figure 3:
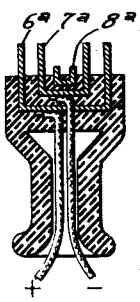

Referring to the drawings, Figure 1 illustrates one embodiment of my invention for charging storage batteries of two different potentials in which the positive and negative conductors of a three-wire, two-potential circuit are used as a high potential source of charging current and the positive and neutral conductors of a three-wire, two-potential circuit are used as a low potential source of charging current and each source is connected to a separate receptacle; Fig. 2 is a modification of the arrangement shown in Fig. 1 in which the neutral and negative conductors of the three-wire, two-potential circuit are used as the low potential source of charging current; Fig. 3 is a cross-section of one form of plug which may be used to connect the battery to be charged to one of the charging circuits; and Figs. 4 and 5 are modifications of the arrangements shown in Fig. 2 and 1 respectively in which each source is connected to the same receptacle so that the insertion of a plug into a receptacle will effect the completion of a charging circuit between the battery connected to the plug and the proper one of said sources of charging current.

Referring to Fig. 1 to clarify—1, 2 and 3 represent the conductors of a three-wire, two-potential direct current distribution circuit. As indicated, the conductor 1 is the positive conductor of the three-wire circuit, the conductor 2 is the neutral conductor and the conductor 3 is the negative conductor. It will be apparent, therefore, that with this arrangement, the conductors 1 and 3 constitute a high potential source of direct current and either the conductors 1 and 2 or the conductors 2 and 3 may be used as a low potential source of direct current.

In the arrangement shown in Fig. 1 the conductors 1 and 2 are used as the low potential source of charging current and the conductors 1 and 3 are used as the high potential source of charging current.

For connecting the batteries to be charged to the proper source of charging current, I provide each source with a plurality of receptacles which are wired to the corresponding source and which are adapted to have inserted therein plugs to each of which are connected a battery to be charged. In the arrangement shown, the low potential source 1—2 is provided with the receptacles 4, only one of which is shown, and the high potential source 1—3 is provided with the receptacles 5 only one of which is shown. These receptacles are diagrammatically shown as being of the well known concentric type, but it will be apparent that my invention is not limited to this particular form of manually controlled switching means for connecting a battery to a source of charging current, but that any other suitable manually controlled switching means may be used.

As shown in the drawing, the receptacle 4 is provided with contacts 6, 7, 8 and 9. The contact 6 is connected to the positive conductor 1 through a portion of a resistance 10. The conductor 7 is connected to one end of a winding 11 of a relay 12, the other end of which is connected to the neutral conductor 2 which constitutes the negative side of the low potential source. The contact 8 is connected to one end of a coil 13 of the relay 12, the other end of which is connected to one side of the high potential circuit and the contact 9 is connected to the other side of the high potential circuit 3. The windings 11 and 13 of the relay 12 are so designed that when one of said windings only is energized, or said windings are energized so that the magnetomotive forces set up thereby oppose each other, the relay does not close its contacts. When, however, both windings are energized so that the magnetomotive forces set up thereby are in the same direction, the relay closes its contacts. The winding 13 is also designed so that after the relay has closed its contacts the force exerted by this winding alone is sufficient to maintain the relay in its closed position. The closing of the contacts of the relay 12 completes the circuit of the coil of contactor 14 across the high potential circuit through the contacts 8 and 9 of the receptacle 4. The closing of the contactor 14 completes a shunt circuit around the winding 11 of the relay 12 so that contact 7 of the receptacle 4 is connected directly to the negative conductor 2 of the low potential circuit. The closing of the contactor 14 also completes a circuit for the lamp 15 associated with the receptacle 4. The lighting of this lamp indicates that the charging circuit through the receptacle 4 is completed.

The receptacle 5 which is similar in construction to the receptacle 4 is provided with four contacts 6', 7', 8' and 9'. The contact 6' is connected to the positive conductor 1 of the high potential circuit through the whole of the resistance 10. The contact 7' is adapted to be connected to the negative conductor 3 of the high potential circuit. In series with the contact 7' is connected the winding of an overload relay 17. The contact 9' is connected through the contacts of the overload relay 17 to one end of the coil of contactor 16, the other end of said coil being connected to one side of the high potential circuit. Contact 8' is connected to the other side of the high potential circuit. The contactor 16 when in its closed position connected the contact 7' to the negative side of the high potential circuit and also completes a circuit across the high potential circuit for the lamp 19 associated with the receptacle 5.

The plug which is used with the receptacles 4 and 5 is shown in Fig. 3. This plug is provided with three sets of contacts $6^a$, $7^a$, and $8^a$. These contacts are so arranged that when the plug is inserted into a receptacle 4, the contacts $6^a$ and $7^a$ engage the contacts 6 and 7 of the receptacle and the contact $8^a$ connects the receptacle contacts 8 and 9 together and when it is inserted into a receptacle 5 the contacts $6^a$ and $7^a$ engage the receptacle contacts 6' and 7' and the contact $8^a$ connects the receptacle contacts 8' and 9' together. The battery to be charged is connected to the contacts $6^a$ and $7^a$, the positive terminal of the battery being connected to the contact $6^a$ and the negative terminal to the contact $7^a$. The contact $8^a$ of the plug is not as long as the contacts $6^a$ and $7^a$ so that when the plug is inserted into a receptacle the contacts $6^a$ and $7^a$ engage their cooperating contacts before the contact $8^a$ engages its cooperating contacts and when the plug is withdrawn from the receptacle contact $8^a$ is moved out of engagement with its cooperating contacts before the contacts $6^a$ and $7^a$ are moved out of engagement with their cooperating contacts.

The operation of the arrangement shown in Fig. 1 is as follows: Let it be assumed that the battery to be charged is of such a voltage that it should be connected to the low potential circuit 1—2 and that the plug to which the battery is connected is inserted in the receptacle 4. Since the voltage of the battery is lower than the voltage across the low potential circuit 1—2, current will flow through the coil 11 of the relay 12 from the circuit 1—2 to the battery when contacts 6ª and 7ª of the plug engage the receptacle contacts 6 and 7 respectively. This current alone, however, is not sufficient to cause the relay 12 to close. When, however, the plug has been inserted far enough for the contact 8ª to connect the contacts 8 and 9 together the circuit of the coil 13 of the relay 12 is completed. The windings 11 and 13 are so arranged that the magnetomotive forces set up thereby at this time are in the same direction and therefore the relay 12 closes its contacts whereupon the circuit of the coil of the contactor 14 is completed across the high potential circuit 1—3 through the receptacle contacts 8 and 9 and the plug contact 8ª. The closing of contactor 14 completes a shunt circuit around the coil 11 of the relay 12 so that the battery to be charged is connected directly across the low potential source 1—2. A portion of the resistance 10, however, is connected in this charging circuit so that the battery may be given a taper charge. The closing of contactor 14 also completes the circuit of the lamp 15 associated with the plug 4. The lighting of this lamp informs the operator that the charging circuit through the receptacle 4 is completed. When it is desired to remove the battery from the charging source, the plug is removed from the receptacle 4. Since the contact 8ª is shorter than the contacts 6ª and 7ª, it will be evident that the circuit of the contactor 14 will be opened at the contacts 8 and 9 of the receptacle before the charging circuit is opened at the contacts 6 and 7. The contactor 14 will therefore become de-energized and open the charging circuit at the contacts before this circuit is broken at the contacts 6 and 7. Therefore, it will be evident that no arc will be formed at the contacts of the receptacle 4 when the plug is removed.

Let it now be assumed that the battery to be charged is of such a voltage that it should be connected to the high potential source 1—3 and that the plug to which the battery is connected is inserted in the receptacle 5. When the plug has been inserted far enough for the contact 8ª of the plug to engage contacts 8′ and 9′ the circuit of the coil of the contactor 16 is completed. The closing of this contactor 16 completes the charging circuit between battery and the charging source 1—3 through the resistance 10 so that the battery will receive a taper charge. Since the voltage of the battery will be nearly equal to the voltage of the source 1—3 the charging current through the overload relay 17 is not sufficient to cause this relay to operate. The closing of contactor 16 also completes the circuit of the lamp 19. The lighting of this lamp informs the operator that the charging circuit through the receptacle 5 is completed. When it is desired to disconnect the battery from the high potential source 1—3, the plug is removed from the receptacle 5. Since the plug contact 8ª is the first to be moved out of engagement with its cooperating contacts it will be evident that that charging circuit is broken at the contacts of the contactor 16 before the contacts 6ª and 7ª are moved out of engagement with the receptacle contacts 6′ and 7′. Let it now be assumed that the battery to be charged is of such a voltage that it should be connected to the low potential source 1—2 and that the plug to which it is connected is inserted into the receptacle 5. When the plug has been inserted far enough for the plug contact 8ª to engage the receptacle contacts 8′ and 9′, the circuit of the contactor 16 is completed and the contactor closes the circuit between the high potential source 1—3 and the battery to be charged. Since the voltage of the battery to be charged is much lower than the voltage of the high potential source, the current through the above-mentioned charging circuit is of such a value that the overload relay 17 operates and interrupts the circuit of the contactor 16, which thereupon opens and interrupts the charging circuit. The overload relay 17 is preferably of the hand reset type, so that the circuit of the contactor 16 cannot again be closed until the operator has manually reset the overload relay. Since the lamp 19 associated with the plug 5 is not lighted at this time, the operator is informed that he has made a wrong connection.

Let it now be assumed that the battery to be charged is of such a voltage that it should be connected to the high potential source 1—3 and that the plug to which it is connected is inserted in the receptacle 4. Since the voltage of the battery in this case is higher than the voltage across the low potential circuit 1—2 current will flow from the battery to the circuit 1—2 when the plug contacts 6ª and 7ª engage the receptacle contacts 6 and 7. Therefore when the plug has been inserted far enough for the plug contact 8ª to engage the receptacle contacts 8 and 9 to complete the circuit of the coil 13 of relay 12, the relay is not operated to close its contacts because the magnetomotive forces produced by the windings 11 and 13 are in opposition to each other. Inasmuch as the relay 12 does not close its contacts the contactor 14 remains in its open position so that the charging circuit is not completed between the high potential battery and the low potential source 1—2. The operator will be informed of this fact by the lamp 15, which is not lighted at this time. The modification shown in Fig. 2 is an arrangement similar to that shown in Fig. 1 except that the conductors 2 and 3 of the three-wire, two-potential circuit constitute the low potential source of charging current. This change in the source of potential used necessitates the following changes in the wiring of the system. The contact 6 of the receptacle 4 is connected to the conductor 2 and the contact 7 is connected to the conductor 3 through a portion of the resistance 10. In this modification, the coil of the overload relay 17 and the contacts of the contactor 16 are connected in series with the connection between the contact 6' of the receptacle 5 and the conductor 1 and the resistance 10 is inserted in the connection between the contact 7' of the receptacle 5 and the conductor 3.

The operation of the arrangement shown in this figure will be obvious from the description given in connection with Fig. 1 and therefore a detailed description of the arrangement shown in this figure is deemed unnecessary. In actual practice, it will be advantageous to use both of these modifications in the same system in order to balance the load on the generating apparatus.

The arrangement shown in Fig. 4 is the arrangement shown in Fig. 2 modified so that a charging circuit is automatically completed between the battery to be charged and the proper one of the sources of charging current whenever a plug, to which the battery is connected, is inserted into a receptacle.

In the arrangement shown in this figure both sources of charging current 1—3 and 2—3 are connected to the same receptacle 4ᵇ which is similar in construction to the receptacles shown in Figs. 1 and 2. The contact 7ᵇ of the receptacle 4ᵇ is connected to the negative conductor 3 of the high potential circuit 1—3 and the contact 6ᵇ of receptacle 4ᵇ is adapted to be connected either to the neutral conductor 2 through the resistance 28 by means of a contactor 31 or to the positive conductor 1 of the high potential circuit through the resistance 29 by means of a contactor 30. The circuit of the coil of the contactor 30 is adapted to be completed across the high potential circuit 1—3 by a relay 32 and the coil of the contactor 31 is adapted to be completed across the high potential circuit 1—3 by a relay 33. The relays 32 and 33 are provided with the windings 34 and 35 respectively. One end of each of these windings 34 and 35 is connected to one of the main contacts of the contactor 31 and the other end of each one of these windings is adapted to be connected to the other main contact of the contactor 31 through the auxiliary contacts 36 of the contactor 30 when this contactor is closed. The relays 32 and 33 are also provided with the windings 38 and 39 respectively. One end of each of these windings is connected to the contact 8ᵇ of the receptacle 4ᵇ. The other end of the coil 39 is adapted to be connected to one side of the high potential source 1—3 by means of the auxiliary contacts 40 of the contactor 30 when this contactor is in its open position. The other end of the winding 38 is also adapted to be connected to the same conductor of the high potential circuit by means of the auxiliary contacts 41 of the contactor 31 when this contactor is in its open position. The contact 9ᵇ of the receptacle 4ᵇ is connected to the opposite conductor of the high potential circuit. The windings of the relays 32 and 33 are so arranged with respect to one another that when the four windings are simultaneously energized, the magnetomotive forces set up by the windings on one of the relays will be in the same direction and the magnetomotive forces set up by the windings on the other relay are in opposite directions. The contactor 30 when in its closed position completes at its auxiliary contacts 42 the circuit of a lamp 43. The contactor 31 when in its closed position completes at its auxiliary contacts 45 the circuit of a lamp 44.

The operation of the arrangement shown in Fig. 4 is as follows: Let it be assumed that the battery to be charged is of such a voltage that it should be connected to the low potential source 2—3. When the plug to which this battery is connected is inserted into the receptacle 4ᵇ and the contacts 6ᵃ and 7ᵃ of the plug engage the receptacle contacts 6ᵇ and 7ᵇ the battery is connected across the low potential source 2—3. This circuit includes the windings 34 and 35 of the relays 32 and 33. Since the voltage of the battery is lower than the voltage of the low potential source 2—3, current flows through the windings 34 and 35 from the source to the battery. These windings are so arranged that the current through these windings at this time is not sufficient to operate the relays. When the plug has been inserted far enough so that the contact 8ᵃ connects the contacts 8ᵇ and 9ᵇ of the receptacle together, the circuit of the windings 38 and 39 is completed across the high potential circuit 1—3. The windings 35 and 39 are so designed that the magnetomotive forces set up thereby are in the same direction at this time and the magnetomotive forces set up by the windings 34 and 38 are in opposite directions. The relay 33, therefore, closes and completes the circuit of the coil of the contactor 31. Contactor 31 closes and completes the charging circuit for the battery across the low potential source 2—3. This charging circuit includes the resistance 28 so that the battery is given a taper charge. The closing of the main contacts of contactor 31 also completes a shunt circuit around the windings 34 and 35 but sufficient current flows through the winding 39 at this time to maintain the relay 33 in its closed position. Closing of the contactor 31 also opens the auxiliary contacts 41 so that the circuit of the winding 38 is interrupted and a circuit through the contacts 45 is completed for the lamp 44. The lighting of this lamp informs the operator that the charging circuit between the low potential source 2—3 and the battery has been completed. The purpose of opening the circuit of the coil 38 is to prevent the relay 32 from closing while the contactor 31 is in its closed position. It will be apparent that if both of the contactors 30 and 31 closed at the same time a short circuit would be completed across the conductors 1 and 2.

When it is desired to disconnect the battery from the charging source, the plug to which the battery is connected is removed from the receptacle $4^b$. As soon as the contact $8^a$ of the plug is moved out of engagement with the contacts $8^b$ and $9^b$ of the receptacle the relay 33 becomes deenergized and opens the circuit of the contactor 31. Contactor 31 then opens and interrupts the charging circuit at its main contacts. Since the plug is so arranged that contact $8^a$ is moved out of engagement with its cooperating contact before the contacts $6^a$ and $7^a$ are moved out of engagement with their cooperating contacts it will be evident that the charging circuit will be interrupted at the main contacts of the contactor 31 before the plug has been removed from the receptacle.

Let it now be assumed that the battery to be charged is of such a voltage that it should be connected to the high potential source 1—3. When the plug to which the battery is connected is inserted in the receptacle $4^b$ the current through the windings 34 and 35 flows from the battery to the low potential source 2—3 since the voltage of the battery is higher than the voltage of this source. Consequently, the magnetomotive forces set up by the windings 34 and 38 are in the same direction and the magnetomotive forces set up by the windings 35 and 39 are in opposite directions when the plug has been inserted far enough to complete the circuit of the windings 38 and 39. Therefore, in this case the relay 32 is operated and completes the circuit of the coil of the contactor 30. The closing of the contactor 30 connects the contact $6^b$ of the receptacle to the positive side 1 of the high potential circuit 1—3 thereby completing the charging circuit for the battery, this charging circuit including the resistance 29 so that the battery receives a taper charge. The closing of contactor 30 also completes the circuit of the lamp 43 and opens the circuits of the windings 34, 35, and 39. The opening of the circuits of the windings 35 and 39 prevent the relay 33 from closing while the contactor 30 is closed. The lighting of the lamp 43 informs the operator that the high potential source 1—3 is connected to the battery. When it is desired to disconnect the battery from the high potential source, the plug to which the battery is connected is removed from the receptacle $4^b$. As soon as the contact $8^a$ of the plug is moved out of engagement with contacts $8^b$ and $9^b$ the circuit of the winding 38 of the relay 32 is opened whereupon the contactor 30 opens and interrupts the charging circuit before the contacts $6^a$ and $7^a$ are moved out of engagement with contacts $6^b$ and $7^b$.

The arrangement shown in Fig. 5 is similar to that shown in Fig. 4, except that the conductors 2, 3 constitute the low potential source of charging current. This change in the source of potential used necessitates the following changes in the connection of the contacts of receptacle $4^b$. The contact $6^b$ is connected directly to the positive conductor 1 of the high potential source 1—3 and the contact $7^b$ is adapted to be connected either to the positive conductor 2 of the low potential source through the resistance 28 by means of contactor 31 or to the negative conductor 3 through the resistance 29 by means of the conductor 30. The operation of the arrangement shown in this figure will be obvious from the description given above in connection with Fig. 4, and, therefore, a detailed description of the operation thereof is deemed unnecessary. It will be evident that in actual practice it will be advantageous to use both of the modifications shown in Figs. 4 and 5 in the same system in order to balance the load on the generating apparatus.

While I have shown and described several modifications of my invention, I do not desire to be limited to the exact arrangements shown, but I aim to cover in the appended claims all such changes which come within the spirit and scope of my invention.

What I claim as new and desire to secure by Letters Patent of the United States, is:—

1. In a battery charging system, the combination of a source of charging current, a battery, a manually controlled switch connected between said battery and said source and arranged to complete a circuit in which the direction of current depends upon the relative voltages of said battery and said source, and means controlled by the direction of current in said circuit for completing a charging circuit between said battery and said source.

2. In a battery charging system, the combination of a source of charging current, a battery, a manually controlled switch connected between said battery and said source and arranged to complete a circuit in which the direction of current depends upon the relative voltages of said battery and said source, and an electromagnetic device controlled by the direction of current in said circuit for completing a charging circuit between said battery and said source.

3. In a battery charging system, the combination of a source of charging current, a battery, a manually controlled switch connected between said battery and said source and arranged to complete a circuit in which the direction of current depends upon the relative voltages of said battery and said source, and a relay adapted to effect the completion of a charging circuit between said battery and said source comprising a winding connected in said first mentioned circuit between said battery and source and a second winding the circuit of which is adapted to be completed by said manually controlled switch after said first-mentioned circuit is completed, said windings being arranged so that said relay is operated to effect the completion of said charging circuit only when both of said windings aid each other.

4. In a battery charging system, the combination of a source of charging current, a battery, a manually controlled switch adapted to complete a circuit between said battery and said source, a relay having a winding in said circuit and a second winding the circuit of which is adapted to be completed by said manually controlled switch, and a second relay, controlled by said first mentioned relay and adapted to complete a short circuit around the first mentioned winding of said relay to complete a charging circuit between said battery and said source.

5. In a battery charging system, the combination of a source of charging current, a battery, a manually controlled switch adapted to complete a circuit between said battery and said source, a relay having a winding in said circuit and a second winding the circuit of which is adapted to be completed by said manually controlled switch, and a second relay controlled by said first mentioned relay and adapted to complete a short circuit around the first mentioned winding of said relay to complete a charging circuit between said battery and said source, and a signal controlled by said second relay.

6. In a battery charging system, the combination of a plurality of sources of charging current, each being of a different potential, a battery adapted to be charged by one of said sources, a manually controlled switch adapted to complete a circuit between said battery and one of said sources, and means controlled by the direction of current in said circuit for automatically completing a charging circuit between said battery and the proper one of said sources.

7. In a battery charging system, the combination of a plurality of sources of charging current, each being of a different potential, a battery adapted to be charged by one of said sources, a manually controlled switch adapted to complete a circuit between said battery and one of said sources, and means controlled by the difference in potential between said battery and the potential of the last mentioned source for automatically completing a charging circuit between said battery and the proper one of said sources.

8. In a battery charging system, the combination of a plurality of sources of charging current, each being of a different potential, a battery adapted to be charged by one of said sources, a manually controlled switch adapted to complete a circuit between said battery and one of said sources, means controlled by the direction of current in said circuit for automatically completing a charging circuit between said battery and the proper one of said sources, and means for indicating which of said sources is supplying charging current to the battery.

9. In a battery charging system, the combination of two sources of charging current, each being of a different potential, a battery adapted to be charged by one of said sources, a manually controlled switch adapted to complete a circuit between said battery and one of said sources, switching means associated with each source, and means controlled by the direction of current in said circuit for automatically operating the proper one of said switching means to complete a charging circuit between said battery and the proper one of said sources.

10. In a battery charging system, the combination of two sources of charging current, each being of a different potential, a battery adapted to be charged by one of said sources, a manually controlled switch adapted to complete a circuit between said battery and one of said sources, switching means associated with each source, means controlled by the direction of current in said circuit for automatically operating the proper one of said switching means to complete a charging circuit between said battery and the proper one of said sources, and means associated with each switching means for preventing the operation of more than one of said switching means at any instant.

11. In a battery charging system, the combination of two sources of charging current, each being of a different potential, switching means associated with each source, a battery adapted to be charged by one of said sources, a manually controlled switch adapted to complete a circuit between said battery and one of said sources, and a relay associated with each one of said switching means and adapted to control the operation thereof, each one of said relays having a winding connected in said circuit and another winding in a circuit adapted to be connected to one of said sources by said manually controlled switch, said coils being arranged so that the windings of one relay act accumulatively when the current through said first mentioned circuit is in one direction, and the coils of the other relay act accumulatively when the current through said first mentioned circuit is in the opposite direction.

12. In a battery charging system, the combination of two sources of charging current, each being of a different potential, switching means associated with each source, a relay associated with each one of said switching means and adapted to control the operation thereof, each relay comprising two coils, a battery adapted to be charged by one of said sources, and a manually operated switch arranged so that said battery is first connected to one of said sources in a circuit including a coil of each relay, and then a circuit for the other two coils of the relay is completed, said coils being arranged so that the coils of one of the relays act accumulatively when the current in the first mentioned circuit is in one direction and the coils of the other relay act accumulatively when the current in said first mentioned circuit is in the opposite direction.

13. In a battery charging system, the combination of two sources of charging current, each being of a different potential, switching means associated with each source, a relay associated with each one of said switching means and adapted to control the operation thereof, each relay comprising two coils, a battery adapted to be charged by one of said sources, a manually operated switch arranged so that said battery is first connected to one of said sources in a circuit including a coil of each relay, and then a circuit for the other two coils of the relay is completed, said coils being arranged so that the coils of one of the relays act accumulatively when the current in the first mentioned circuit is in one direction and the coils of the other relay act accumulatively when the current is in the opposite direction, and means controlled by said switching means for indicating which one of said switching means is operated.

In witness whereof, I have hereunto set my hand this 5th day of April 1921.

HARRY M. JACOBS.